(12) United States Patent
Aikoh et al.

(10) Patent No.: US 11,308,102 B2
(45) Date of Patent: Apr. 19, 2022

(54) DATA CATALOG AUTOMATIC GENERATION SYSTEM AND DATA CATALOG AUTOMATIC GENERATION METHOD

(71) Applicant: HITACHI, LTD., Tokyo (JP)

(72) Inventors: Kazuhide Aikoh, Tokyo (JP); Eri Teruya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 520 days.

(21) Appl. No.: 16/379,501

(22) Filed: Apr. 9, 2019

(65) Prior Publication Data

US 2019/0310982 A1  Oct. 10, 2019

(30) Foreign Application Priority Data

Apr. 10, 2018  (JP) .............................. JP2018-075488

(51) Int. Cl.
*G06F 16/30* (2019.01)
*G06F 16/2458* (2019.01)
*G06K 9/62* (2022.01)
*G06Q 10/06* (2012.01)
*G06N 5/02* (2006.01)

(52) U.S. Cl.
CPC ......... *G06F 16/2465* (2019.01); *G06K 9/626* (2013.01); *G06N 5/025* (2013.01); *G06Q 10/063* (2013.01)

(58) Field of Classification Search
CPC .... G06F 16/2465; G06K 9/626; G06N 5/025; G06Q 10/063
See application file for complete search history.

(56) References Cited

U.S. PATENT DOCUMENTS

| | | | |
|---|---|---|---|
| 2002/0128998 A1* | 9/2002 | Kil | ...................... G06F 16/2465 |
| 2003/0061212 A1* | 3/2003 | Smith | .................. G06F 16/2453 |
| 2011/0173164 A1* | 7/2011 | Bendel | .............. G06F 16/24561 |
| | | | 707/693 |
| 2014/0062760 A1 | 3/2014 | Asada et al. | |
| 2015/0213035 A1 | 7/2015 | Collins et al. | |
| 2017/0339042 A1* | 11/2017 | Sommer | .................. H04L 43/50 |
| 2018/0081501 A1* | 3/2018 | Johnston | ............... G06F 3/0482 |

FOREIGN PATENT DOCUMENTS

JP   2005-532671 A   10/2005

OTHER PUBLICATIONS

Japanese Office Action dated Apr. 14, 2020 for the Japanese Patent Application No. 2018-075488.

* cited by examiner

*Primary Examiner* — Mahesh H Dwivedi
(74) *Attorney, Agent, or Firm* — Volpe Koenig

(57) ABSTRACT

A technology is disclosed that makes it possible even for an analyst, who has poor knowledge relating to field data, to select and use analysis data in analysis. A data catalog automatic generation system that generates a catalog tag to be used to select analysis data from collected field data is configured such that, based on a set classification rule input, a relationship between an objective variable as an analysis perspective relating to field data and an explanatory variable or a causal relationship between a plurality of the explanatory variables is extracted, and based on a result of the extraction, a catalog tag of the objective variable and a catalog tag of the explanatory function are specified and attached.

5 Claims, 17 Drawing Sheets

FIG.3A (312)
2121

| PRODUCT ID | RAW MATERIAL COST | LABOR COST | | EXPENSE | | TOTAL | |
|---|---|---|---|---|---|---|---|
| | VARIABLE COST | FIXED COST | VARIABLE COST | FIXED COST | VARIABLE COST | FIXED COST | VARIABLE COST |
| Product A | 3,000 | 1,000 | 1,000 | 500 | 200 | 1,500 | 4,200 |
| Product B | 2,000 | 1,000 | 1,000 | 300 | 100 | 1,300 | 3,100 |

| PRODUCT ID | ORDER DATE | ORDER QUANTITY | AMOUNT OF PAYMENT | CUSTOMER ID |
|---|---|---|---|---|
| ProductA | 2017-02-28 | 3 | 1980 | Client1 |
| ProductB | 2016-10-24 | 1 | 600 | Client2 |

| CUSTOMER ID | AGE | LAST USE DATE | NUMBER OF SALES ACTIVITY | SUBSCRIPTION APPLICATION |
|---|---|---|---|---|
| Client1 | 30 | 2017-06-21 | 3 | no |
| Client2 | 39 | 2016-10-24 | 0 | no |

FIG.4A

| CATALOG MENU | TAG | | TAGGING DESTINATION |
|---|---|---|---|
| KPI TREE | SALES | | AMOUNT OF MONEY |
| | | EXISTING CUSTOMER | CUSTOMER ID |
| | | NEW CUSTOMER | CUSTOMER ID |
| | COST | FIXED COST | AMOUNT OF MONEY |
| | | VARIABLE COST | AMOUNT OF MONEY |

| EVALUATION TARGET | CONDITION | TAG |
|---|---|---|
| ACQUISITION SOURCE | =CRM | KPI_TREE.SALES |
| | =ERP | KPI_TREE.COST |
| FISCAL YEAR DETERMINATION | PRESENT IN OTHER THAN DESIGNATED FISCAL YEAR | EXISTING_CUSTOMER |
| | PRESENT ONLY IN DESIGNATED FISCAL YEAR | NEW_CUSTOMER |

| DATA ID | ACQUISITION SOURCE |
|---|---|
| COST MANAGEMENT DATA | ERP |
| ORDER MANAGEMENT DATA | CRM |
| CUSTOMER MANAGEMENT DATA | CRM |

| CATALOG MENU | TAG | | MAPPING |
|---|---|---|---|
| KPI TREE | SALES | EXISTING CUSTOMER | CUSTOMER_MANAGEMENT_DATA.CUSTOMER_ID |
| | | NEW CUSTOMER | CUSTOMER_MANAGEMENT_DATA.CUSTOMER_ID |
| | COST | FIXED COST | COST_MANAGEMENT_DATA.FIXED_COST |
| | | VARIABLE COST | COST_MANAGEMENT_DATA.VARIABLE_COST |

| PRODUCT ID | TOTAL COST | | SALES |
|---|---|---|---|
| | FIXED COST | VARIABLE COST | |
| Product A | 1,500 | 4,200 | 1980 |
| Product B | 1,300 | 3,100 | 600 |

| CONDITION | OPERATION CLASSIFICATION RULE |
|---|---|
| select (Y) where (X) | INHERIT TAG ATTACHED TO COLUMN Y OF TABLE X, AND ATTACH RELATED TAG |
| join(X1, X2) on x1=x1 | INHERIT TAG ATTACHED TO TABLES X1 AND X2, AND ATTACH RELATED TAG |

FIG.13B

| CATALOG MENU | TAG | | MAPPING | RELATED TAG |
|---|---|---|---|---|
| KPI TREE | SALES | EXISTING CUSTOMER | DATA_MART.SALES | ORDER_MANAGEMENT_DATA.AMOUNT_OF_PAYMENT |
| | | NEW CUSTOMER | DATA_MART.SALES | ORDER_MANAGEMENT_DATA.AMOUNT_OF_PAYMENT |
| | COST | FIXED COST | DATA_MART.TOTAL_COST.FIXED_COST | COST_MANAGEMENT_DATA.FIXED_COST |
| | | VARIABLE COST | DATA_MART.TOTAL_COST.VARIABLE_COST | COST_MANAGEMENT_DATA.VARIABLE_COST |

DATA CATALOG AUTOMATIC GENERATION SYSTEM AND DATA CATALOG AUTOMATIC GENERATION METHOD

BACKGROUND OF THE INVENTION

1. Field of the Invention

The present invention relates to a data catalog automatic generation system and a data catalog automatic generation method and is suitably applied particularly to a data catalog automatic generation system relating to a data classification technology in a so-called Data Lake system.

2. Description of the Related Art

In an analysis process of the social infrastructure system, attention is paid to Data Lake that manages a variety of data on the field. However, since it frequently occurs that the amount of data in a Data Lake is excessively great or organization rules are not unified among different fields, there is the possibility that necessary data may not possibly be extracted. Therefore, it is demanded to carry out data organization using a data catalog (hereinafter referred to simply as "catalog").

As a management method that uses such a catalog as described above, the following first and second technologies are conventionally known. In particular, as the first conventional technology, a technique is known that a tag is attached by crowdsourcing (refer to Patent U.S. Publication Application No. 2014/062760). As the second conventional technology, a technique is known that a data model prescribed in an industry standard in regard to a representation method of data on side in the power field or the like is automatically converted (refer to U.S. Publication Application No. 2015/0213035).

SUMMARY OF THE INVENTION

However, according to the first conventional technology, since attachment of a tag is performed by a manual work, the comprehensiveness is not satisfactory and there is the possibility that leakage may occur. On the other hand, the second conventional technology can be used only in an industry in which a data model of an industry standard is prescribed, and a catalog cannot be selected without sufficient knowledge of the data model of the industry standard. Since it is considered that both of the conventional technologies are directed to a catalog generation method focusing on the field data side, knowledge about field data is required for an analyst.

The present invention has been made taking the foregoing into consideration and proposes an data catalog automatic generation system and a data catalog automatic generation method by which even an analyst who does not have sufficient knowledge of field data can select analysis data and use the analysis data for analysis.

In order to solve the subject described above, according to one aspect of the present invention, there is provided a data catalog automatic generation system that generates a catalog tag to be used to select analysis data from collected field data, including a field data receive section configured to receive the field data, and a data management section configured to extract, based on a set classification rule, a relationship between an objective variable as an analysis perspective of the field data and an explanatory variable corresponding to the objective variable or a causal relationship between a plurality of the explanatory variables corresponding to the objective variable and attach a catalog tag, based on a result of the extraction of the relationship or the causal relationship, to the field data to manage the field data.

According to another aspect of the present invention, there is provided a data catalog automatic generation method for generating a catalog tag to be used to select analysis data from collected field data, including: by a field data acceptance section, accepting the field data; and by a data management section, extracting, based on a set classification rule, a relationship between an objective variable as an analysis perspective of the field data and an explanatory variable corresponding to the objective variable or a causal relationship between a plurality of the explanatory variables corresponding to the objective variable and attaching a catalog tag, based on a result of the extraction of the relationship or the causal relationship, to the field data to manage the field data.

With the present disclosure, it is made possible even for an analyst, who has poor knowledge relating to field data, to select and use analysis data in analysis.

BRIEF DESCRIPTION OF THE DRAWINGS

FIGS. 3A to 3C are views depicting an example of cost management data, order management data and customer management data depicted in FIG. 2;

FIGS. 4A and 4B are views depicting an example of catalog menu data included in catalog data depicted in FIG. 1 and a source classification rule included in the catalog menu data;

FIGS. 5A and 5B are views depicting an example of data source management data and catalog mapping data depicted in FIG. 2;

FIG. 12 is a view depicting an example of a data mart depicted in FIG. 11;

FIGS. 13A and 13B are views depicting an example of an operation classification rule and catalog mapping data depicted in FIG. 11;

DESCRIPTION OF THE PREFERRED EMBODIMENTS

In the following, embodiments of the present disclosure are described in detail with reference to the drawings. In the description of the embodiments, when it is intended to automatically generate a catalog tag (hereinafter referred to also as "tag" in abbreviation) that is used to select data to be used for analysis (hereinafter referred to as "analysis data") from among field data individually collected from a field in a Data Lake system as described in the following manner, a classification rule for classifying the field data is used. In the following description of the embodiments, a case in which, for example, a source classification rule is used as such a classification rule as described above is described as a first embodiment, and another case in which an operation classification rule is used as the classification rule described above is described as a second embodiment.

(1) First Embodiment (1-1) System Configuration

Figure 1:
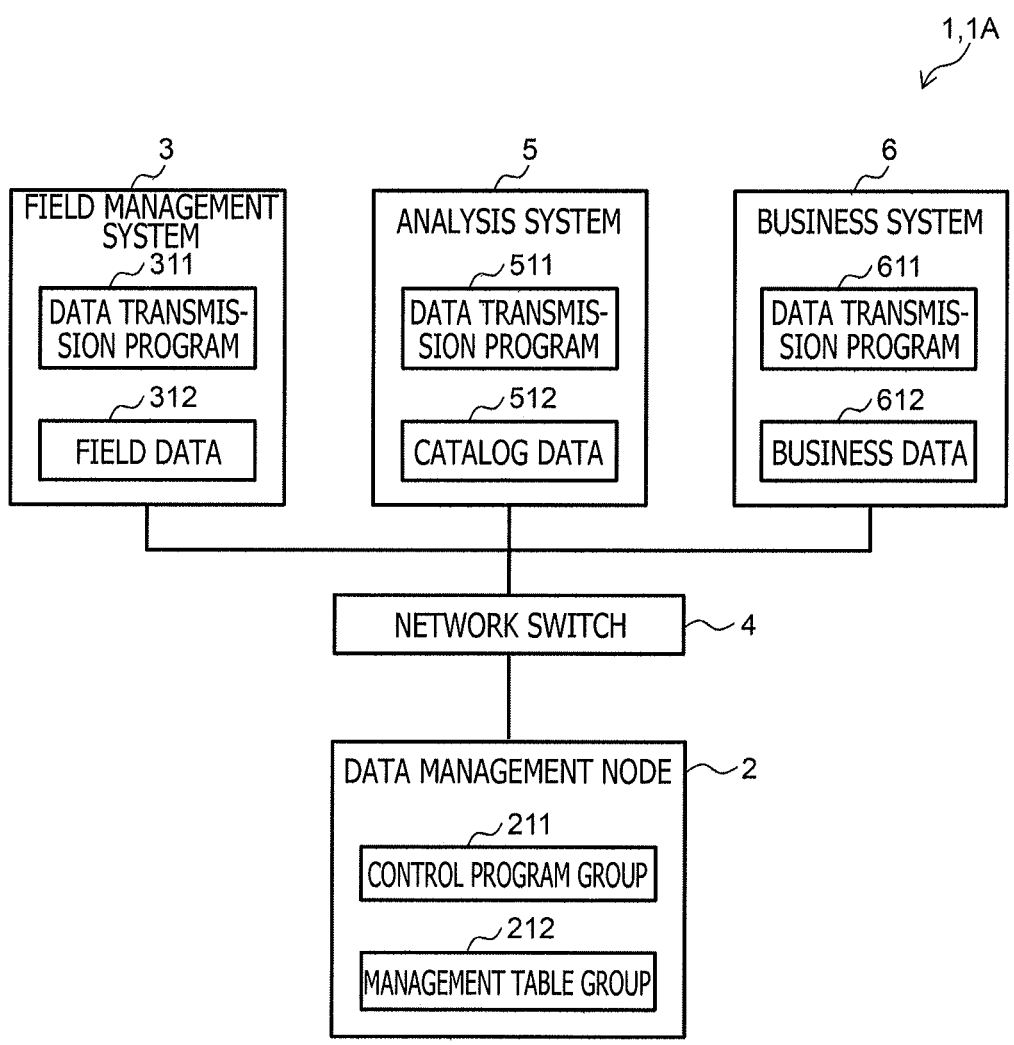
FIG. 1 is a block diagram depicting a general configuration of a Data Lake system according to a first embodiment.

FIG. 1 depicts a general configuration of a Data Lake system according to the first embodiment. This Data Lake system is an example of a data catalog automatic generation system and demonstrates a computer system installed, for example, in a data center.

The data catalog automatic generation system 1 includes a data management node 2, an analysis system 5 and a business system 6 connected to each other through a network switch 4. The data management node 2, analysis system 5 and business system 6 are each configured from a computer such as a personal computer or a work station.

Figure 2:
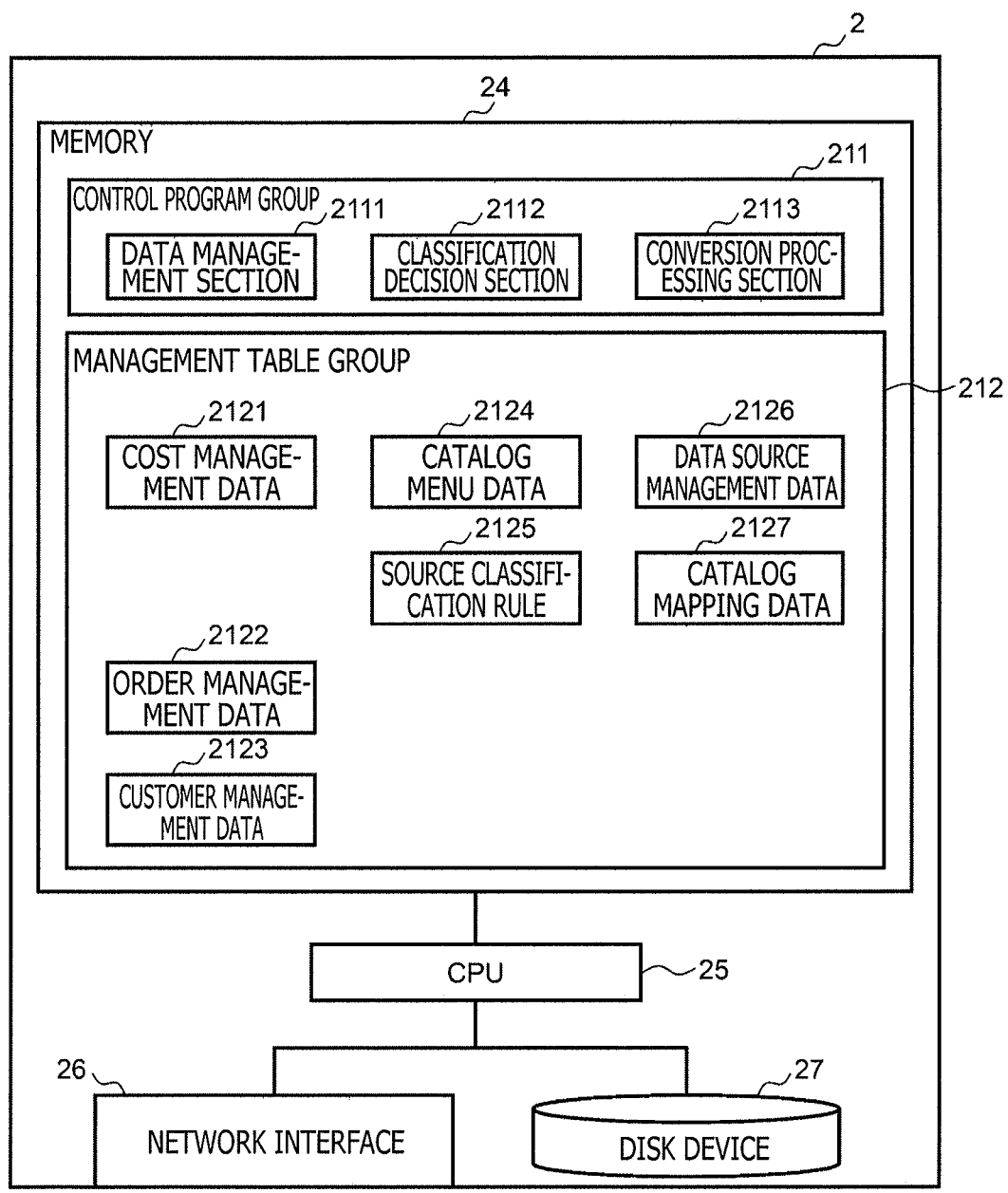
FIG. 2 is a block diagram depicting an example of a configuration of a data management node depicted in FIG. 1.

FIG. 2 is a block diagram depicting an example of a configuration of the data management node 2 depicted in FIG. 1. The data management node 2 includes a memory 24, a CPU (Central Processing Unit) 25, a network interface 26 and a disk device 27 as hardware components. The CPU 25 is a central processing unit that performs operation control of the entire data management node 2.

The memory 24 is used as a work memory when the CPU 25 executes a necessary process. This memory 24 is used to principally store a control program group 211 and a management table group 212.

The network interface 26 is a communication interface compatible with the network switch 4 described above and performs protocol control when the data management node 2 communicates with the outside.

The disk device 27 is a device that incorporates, for example, an FC (Fiber Channel) disk, a SCSI (Small Computer System Interface) disk, a SATA disk, an ATA (AT attachment) disk or a SAS (Serial Attached SCSI) disk and is a storage medium that can store a large amount of data.

On the other hand, the data management node 2 includes, in the memory 24 thereof, a control program group 211 and a management table group 212 as software components.

The control program group 211 includes a data management section 2111, a classification decision section 2112 and a conversion processing section 2113. Although the programs mentioned are represented as separate programs in order to facilitate understandings, they may otherwise be implemented collectively as a single program or may be decomposed arbitrarily in actual incorporation. Although the programs are all disposed on a same node (data management node 2), part of them may be disposed on a different node.

The data management section 2111 accepts a registration request including each pieces of field data 312 from a Field Management system 3, a registration request including catalog data 512 from the analysis system 5 and a processing request including business data 612 from the business system 6.

The data management section 2111 manages cost management data 2121, order management data 2122, customer management data 2123 and catalog menu data 2124. As a particular example of the field data 312, for example, the cost management data 2121 hereinafter described (refer to FIG. 3A) can be listed.

The classification decision section 2112 accepts a processing request from the data management section 2111 and manages the catalog menu data 2124 and a source classification rule 2125. The catalog menu data 2124 and the source classification rule 2125 configure, for example, the catalog data 512.

The conversion processing section 2113 accepts a search request from the business system 6 and generates output data using the catalog data 512 in response to the search request although details are hereinafter described.

FIG. 3A depicts an example of the cost management data 2121 depicted in FIG. 2; FIG. 3B depicts an example of the order management data 2122 depicted in FIG. 2; and FIG. 3C depicts an example of the customer management data 2123 depicted in FIG. 2.

As depicted in FIG. 3A, the cost management data 2121 has a product ID column, a raw material cost column, a labor cost column, an expense column and a total column. The raw material cost column has a variable cost column. The labor cost column has a fixed cost column and a variable cost column. The expense column has a fixed cost column and a variable cost column. The total column has a fixed cost column and a variable cost column.

For example, in the example depicted in FIG. 3A, in order to manufacture a product of a product ID "Product A" in the Field Management system 3, a variable cost "3000" yen is required as the raw material cost; a fixed cost "1000" yen and a variable cost "1000" yen are required as the labor cost; and a fixed cost "500" yen and a variable cost "200" yen are required as the expense. Therefore, it is indicated that a fixed cost "1500" yen and a variable cost "4200" yen are required as a total cost.

The business data 612 of the business system 6 is order data for managing orders from customers relating to products manufactured by the Field Management system 3 and includes such order management data 2122 and customer management data 2123 as described below.

This order management data 2122 includes a product ID column, an order date column, an order quantity column, a column for an amount of payment and a customer ID column as depicted in FIG. 3B. For example, the example of FIG. 3B indicates that, as order data, for the product ID "Product A," an order in which the order quantity is "three" and the total amount of payment is "1980" yen was received from a customer represented by the customer ID of "Client 1" on the order date of "2017-02-28 (Feb. 28, 2017)."

As depicted in FIG. 3C, the customer management data 2123 includes a customer ID column, an age column, a last use data column, a number-of-sales-activities column and a subscription application column. For example, the example of FIG. 3c indicates that, as the customer data managed by the business system 6, the customer whose customer ID is "Client 1" is "30" years old and the last access date to the Web portal is "2017-06-21 (Jun. 21, 2017)," and while the number of times of notification of new product information from the Web portal was "3," the subscription application was "no."

FIG. 4A depicts an example of the catalog menu data 2124 that configures part of the catalog data 512 of the analysis system 5 depicted in FIG. 1, and FIG. 4B depicts an example of the source classification rule 2125 that configures part of the catalog data 512.

The catalog menu data 2124 is information regarding what kind of tag is registered in what kind of tagging destination as an explanatory variable for each catalog menu as an objective variable. The catalog menu data 2124 includes, as columns, for example, a catalog menu column, a tag column and a tagging destination column as depicted in FIG. 4A.

The example of FIG. 4A indicates that, as a catalog menu of "KPI tree," two tags (objective variables) of "sales" and "cost" are registered and two tags (explanatory variables) of "existing customer" and "new customer" are registered as tagging destinations of the "sales" tag while two tags (explanatory variables) of "fixed cost" and "variable cost" are registered as tagging destinations of the "cost tag." Further, in the example of FIG. 4A, the "sales" tag is attached to a column in which "amount of money" is stored and the "existing customer" tag and the "new customer" tag are attached to columns in which "customer ID" is stored.

It is to be noted that, while the example of FIG. 4A indicates an example in which the items of "sales" represent a tree structure (inclusion relation) including "existing customer" and "new customer," also such a relationship that represents an order relation as a relationship of "sales of seller industry" (explanatory variable) and "sales of buyer industry" (explanatory variable) with respect to "sales of industry to which own company belongs" (objective variable) as in a catalog menu of "commercial flow" is applicable.

As depicted in FIG. 4B, the source classification rule 2125 includes an evaluation target column, a condition column and a tag column. For example, the example of FIG. 4B indicates that, in regard to the field data 312 and the business data 612, in the case where a system of "acquisition source" is selected as the evaluation target and the condition of a decision process of the acquisition source is "=CRM," namely, information collected from a CRM system, as a tag, "KPI_TREE.SALES," namely, a sale tag of a KPI tree catalog, is attached. It is to be noted that "." in the tag column indicates that the left and right pieces of information with respect to the same have a relevance or a causal relationship to each other.

The data management node 2 depicted in FIG. 1 generates, as internal data, the following data source management data 2126 and a catalog mapping data 2127 hereinafter described.

FIG. 5A depicts an example of the data source management data 2126 depicted in FIG. 2, and FIG. 5B depicts an example of the catalog mapping data 2127 depicted in FIG. 2. The data source management data 2126 includes a data ID column for each pieces of data for identifying the data from each other, and an acquisition source column indicative of an acquisition source of each pieces of data. In the description of the present embodiment, information relating to the acquisition source is referred to as "acquisition source information."

The example of FIG. 5A indicates that, for example, the acquisition source of data whose data ID is "cost management data," namely, of the cost management data 2121, is an "ERP" system."

As depicted in FIG. 5B, the catalog mapping data 2127 includes a catalog menu column representative of a catalog menu, a tag column and a mapping column. This mapping column corresponds to the field data 312 or the business data 612.

For example, the example of FIG. 5B indicates that, if "KPI tree" is exemplified as a catalog menu, then in the case where the sales tag is "existing customer," as indicated as "CUSTOMER_MANAGEMENT_DATA.CUSTOMER_ID" in the mapping column, the sales is mapped to "CUSTOMER_ID" column of "CUSTOMER_MANAGEMENT_DATA". It is to be noted that "." in the mapping column represents that the left and right items with respect to the same have a relevance or a causal relationship to each other.

(1-2) Data Catalog Automatic Generation Method

The data catalog automatic generation system 1 has such a configuration as described above, and in the following, an example of operation of the data catalog automatic generation system 1 is described with reference to FIGS. 1 to 5.

Figure 6:
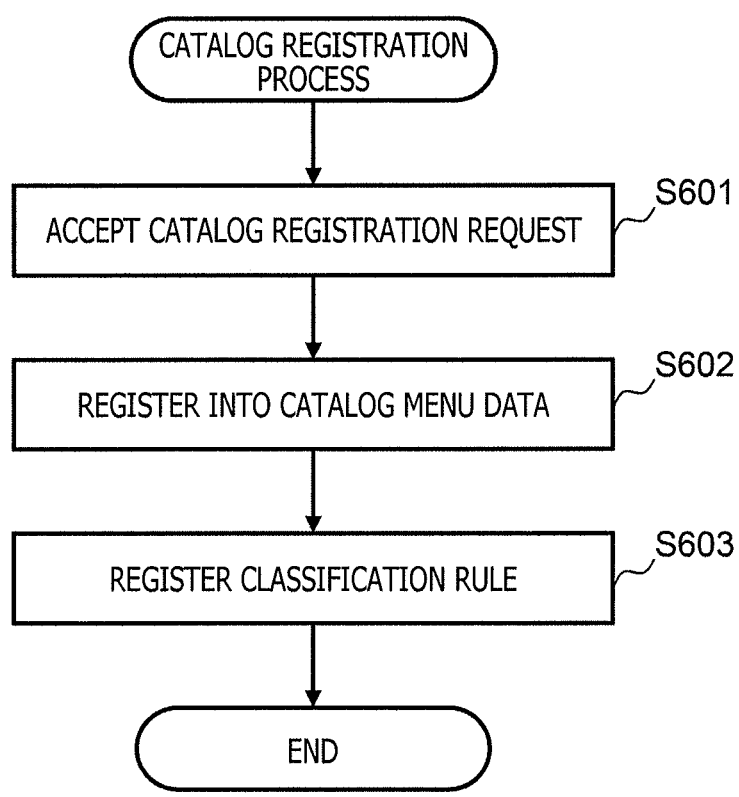
FIG. 6 is a flow chart depicting an example of a processing procedure of a catalog registration process.

FIG. 6 depicts an example of a processing procedure of a catalog registration process. If the data management section 2111 accepts a registration request of the catalog data 512, for example, from the analysis system. 5 (step S601), then it executes the following catalog registration process.

In particular, the data management section 2111 registers, regarding the catalog data 512 input thereto, the catalog menu data 2124 included in the catalog data 512 as depicted in FIG. 4A (step S602) and registers also the source classification rule 2125 included in the catalog data 512 as depicted in FIG. 4B (step S603).

Figure 7:
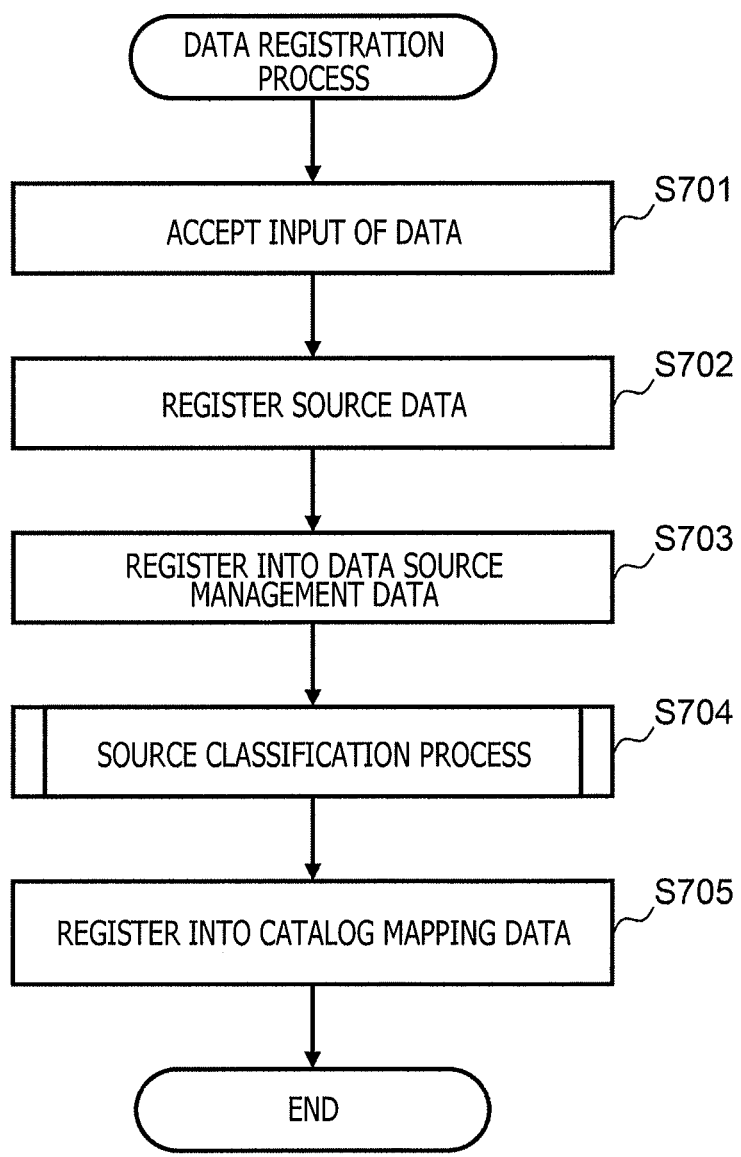
FIG. 7 is a flow chart depicting an example of a processing procedure of a data registration process.

FIG. 7 depicts an example of a processing procedure of the data registration process. In the data catalog automatic generation system 1, if the data management section 2111 accepts at least one of a registration request of field data 312 from the Field Management system 3 or a registration request of business data 612 from the business system 6 as described above (step S701), then the data management section 2111 registers the accepted data into the cost management data 2121, order management data 2122 and customer management data 2123 corresponding to the same (step S702).

Further, the data management section 2111 registers the acquisition source information (for example, a CRM: or an ERP) included in the registration request into the data source management data 2126 as depicted in FIG. 5A for each data ID representative of the cost management data 2121, order management data 2122 or customer management data 2123 (step S703).

Then, the classification decision section 2112 executes a source classification process hereinafter described (step S704) to decide to which tag of the catalog menu the data registered in such a manner as described above corresponds, and registers a result of the decision into the catalog mapping data 2127 depicted in FIG. 5B (step S705).

Figure 8:
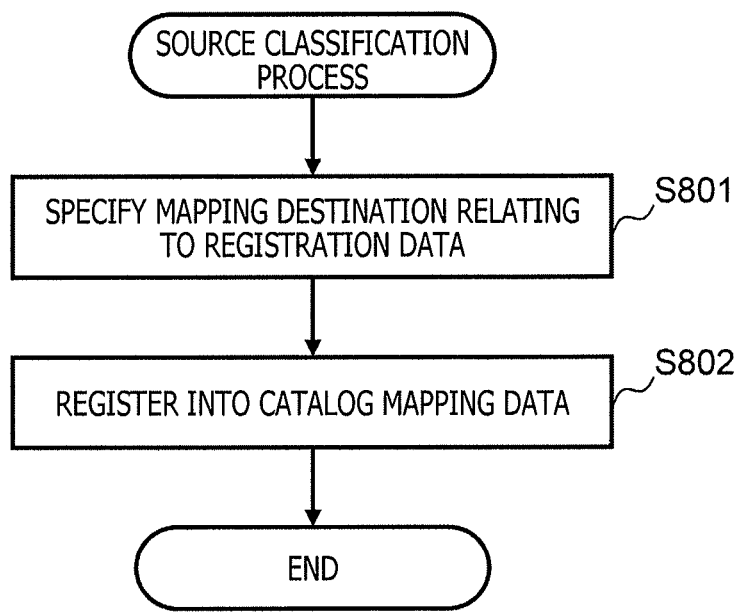
FIG. 8 is a flow chart depicting an example of a processing procedure of a source classification process depicted in FIG. 7.

FIG. 8 depicts an example of a processing procedure of the source classification process depicted in FIG. 7. First, the classification decision section 2112 refers to the source classification rule 2125 and the data source management data 2126 to specify a tag (catalog tag) as the tagging destination in response to a decision request from the data management section 2111 in order to specify a mapping destination in regard to the designated registered data (step S801).

For example, in the case where the order management data 2122 is registered, the classification decision section 2112 refers to the data source management data 2126 depicted in FIG. 5A to specify that the acquisition source is "CRM" on the basis of the data ID.

Then, by referring, for example, to the source classification rule 2125 (refer to FIG. 4B) registered in advance, the classification decision section 2112 can attach, since the acquisition source is "CRM" as described above, "KPI_TREE.SALES" as a tag, namely, can specify that the order management data 2122 is classified into the sales in the case where KPI tree analysis is carried out.

It is to be noted here that, although the source classification rule 2125 is described as static information registered in advance, it may be applied while the source classification rule 2125 is extended on the basis of a machine learning process for the input data (here, corresponding to the order management data 2122), frequent word analysis used in the applicable data of a table format, for example, relating to an object variable and its explanatory variable, or relation priority among a plurality of columns in the table or the like.

On the other hand, for example, in the case where the acquisition source of the input data described above is unknown, the classification decision section 2112 may compare the cost management data 2121 and the customer management data 2123 whose acquisition source is known and words used in columns or records of the input data with each other to calculate a similarity degree between them and decide on the basis of the similarity degree to which data the input data is closer thereby to decide which one of "ERP" and "CRM" the acquisition source is and then apply the source classification rule 2125.

Furthermore, into the acquisition source of the data source management data 2126, not only system information such as "ERP" or "CRM" but also one or a plurality of pieces of arbitrary information, such as a business name like "sales activity data" or a base name like "Tokyo Head Office," for allowing registering persons of the field data 312 or the business data 612 to supplementarily explain the data can be registered for each data ID, and it may be determined that, into the condition column of the source classification rule 2125, a conditional expression in which a plurality of pieces of input source information are combined (for example, "=(CRM or sales activity data)").

Conversely, a common pattern of the acquisition source column of the data source management data 2126 may be extracted by a machine learning process for the catalog mapping data 2127 and the source classification rule 2125 to which tags was attached in the past such that it is presented as input candidates for the acquisition source column to a registering person of the field data 312 or the business data 612. For example, in the case where "if a description of CRM exists in the acquisition source column, then also sales activity data is described additionally without fail," at a point of time at which the CRM is input, sales activity data are presented as candidates.

The classification decision section 2112 registers the input data described above into the catalog mapping data 2127 as depicted in FIG. 5(B) (step S802).

Figure 9:
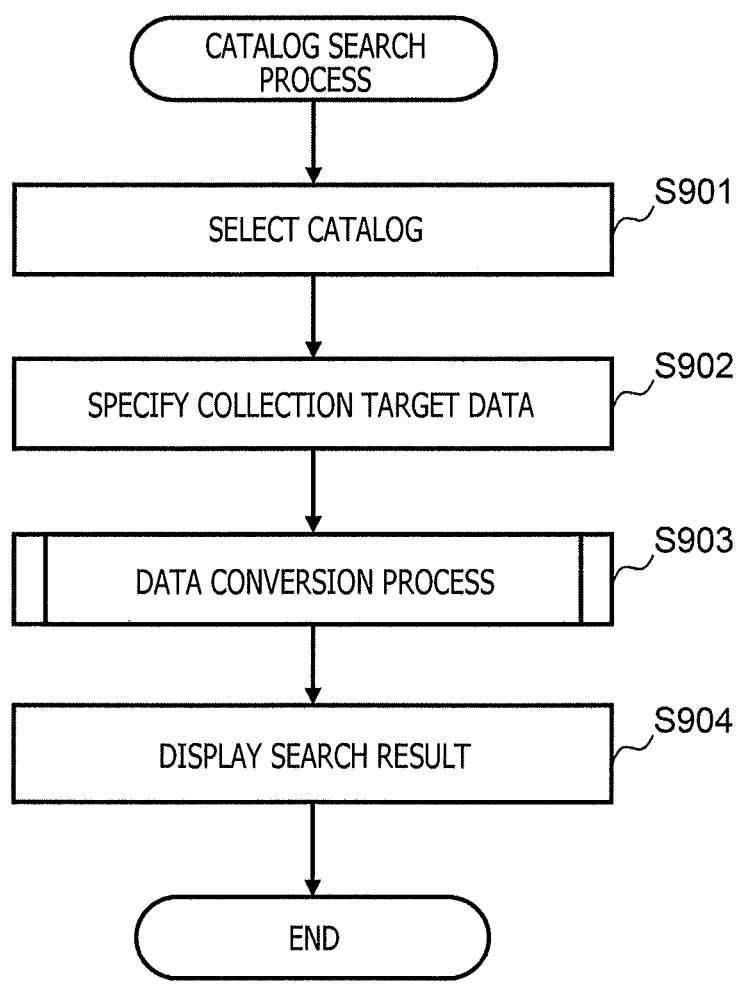
FIG. 9 is a flow chart depicting an example of a processing procedure of a catalog search process.

FIG. 9 depicts an example of a processing procedure of a catalog search process. First, if the data management section 2111 accepts catalog data 512 selected by a user and information of an objective variable (that corresponds to a search key or the like) (step S901), then it refers to the catalog mapping data 2127 described hereinabove to specify collection target data mapped in the selected catalog data 512 (step S902).

Then, the data management section 2111 carries out a data conversion process hereinafter described for the collection target data specified in such a manner as described above (step S903) and presents a result of the search to the user (step S904).

Figure 10:
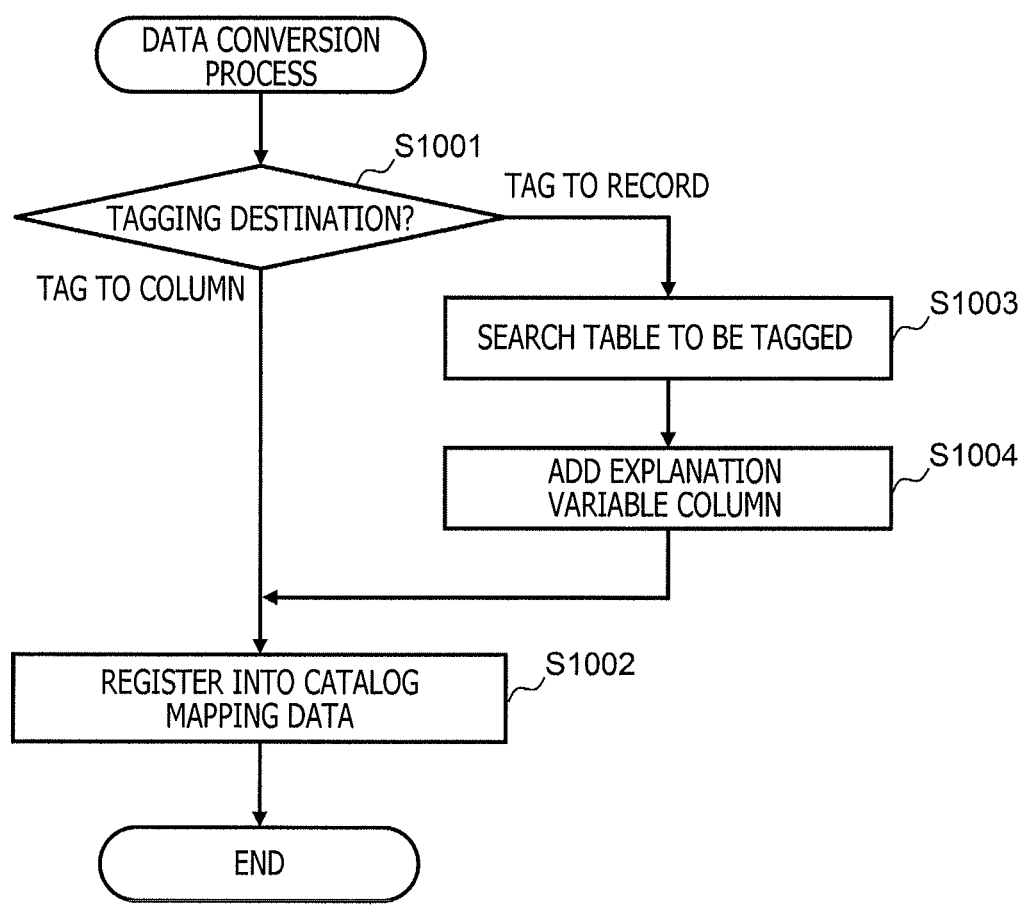
FIG. 10 is a flow chart depicting an example of a processing procedure of a data conversion process depicted in FIG. 9.

FIG. 10 depicts an example of a particular processing procedure of the data conversion process depicted in FIG. 9. First, the conversion processing section 2113 refers to the catalog menu data 2124 in response to a decision request from the data management section 2111 to decide a tagging destination to which a tag is to be attached (step S1001).

In the case where it is decided at step S1001 that a tag is to be attached to a column of the data of a table format, namely, in the case where the tag coincides with the column name of the table, the conversion processing section 2113 registers the tag into the catalog mapping data 2127 depicted in FIG. 5B using the column name as a key (step S1002).

On the other hand, in the case where it is decided at step S1001 that a tag is to be attached to a record of the data of the table format, namely, in the case where the tag does not coincide with any column name of the table, the conversion processing section 2113 searches for a table to which a tag is to be attached (step S1003) and attaches a column name as an explanatory variable to the catalog mapping data 2127 depicted in FIG. 5B, namely, attaches a tag to the table as a column (step S1004), whereafter the conversion processing section 2113 registers the tag into the catalog mapping data 2127 depicted in FIG. 5B using the applicable column name as a key (step S1002).

According to the present embodiment, since a tag can be registered automatically in such a manner as described above, even an analyst having poor knowledge of field data can select analysis data using the tag from the field data and use the analysis data in analysis.

(2) Second Embodiment

Since a Data Lake system LA according to a second embodiment has a configuration and performs operation substantially similar to those of the Data Lake system 1 according to the first embodiment, in the following, description is given principally of differences between the embodiments.

In the second embodiment, after data (data mart) of a result of analysis generated by the analysis system 5 is generated, a data management node 2A executes a data registration process and a catalog search process for the data mart. In the following, the second embodiment is described focusing on differences thereof from the first embodiment.

Figure 11:
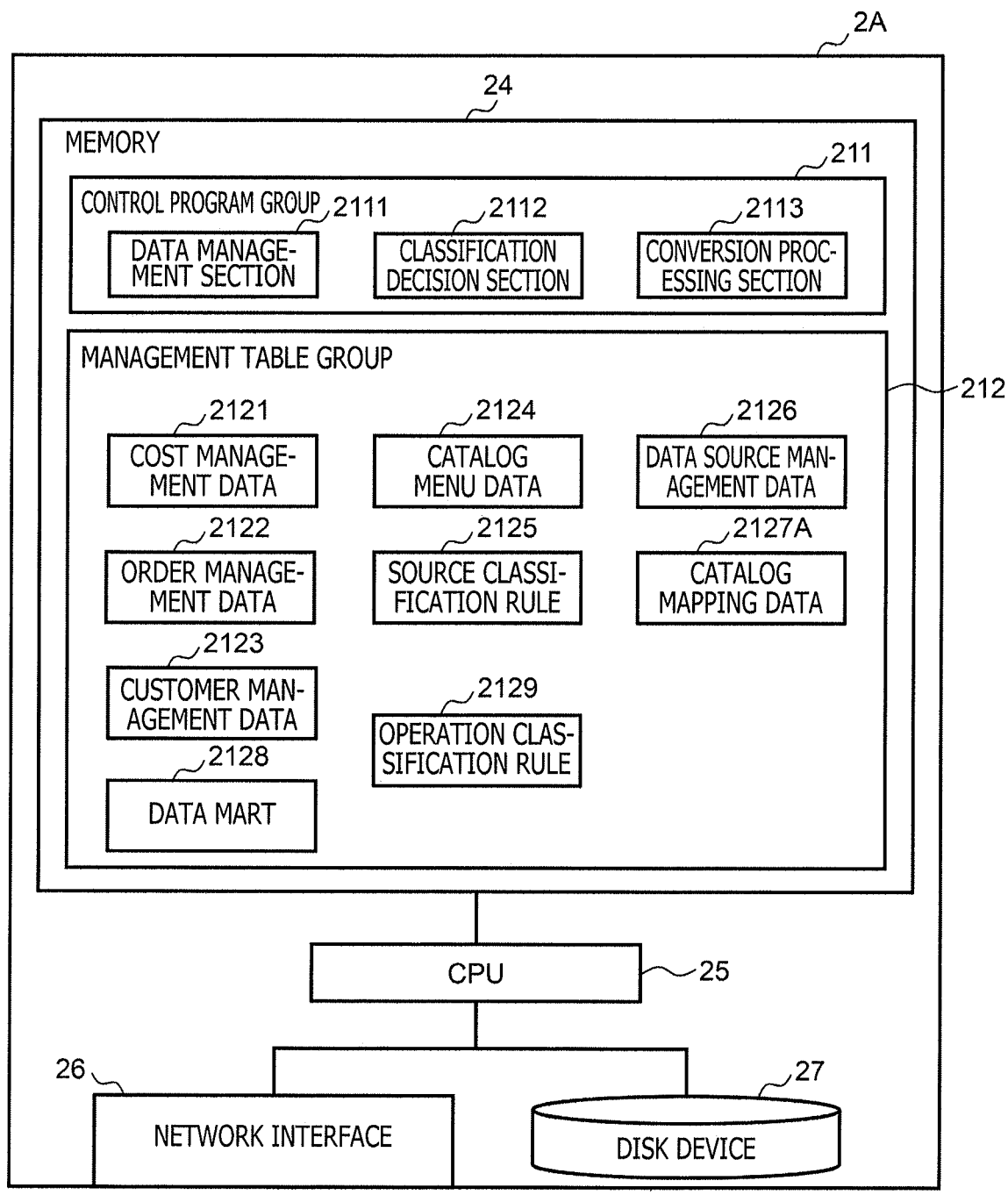
FIG. 11 is a block diagram depicting an example of a configuration of a data management node in a second embodiment.

FIG. 11 depicts an example of a configuration of the data management node 2A in the second embodiment and especially depicts an example of information and programs retained in the memory 24 by the data management node 2A.

In the second embodiment, the data management node 2A prepares an operation classification rule 2129 as a classification rule for classifying individual field data in the memory 24 thereof. The data management node 2A has, in the memory 24 thereof, a data mart 2128 included in a registration request from the analysis system 5.

In the data management node 2A, the conversion processing section 2113 and so forth perform a process hereinafter described using the operation classification rule 2129 when they accept a processing request from the data management section 2111.

FIG. 12 is an example of the data mart 2128 depicted in FIG. 11. The data mart 2128 has a product ID column, a total cost column and a sales column as columns thereof.

In the example depicted, the data mart 2128 generated by the analysis system 5 is such as described below. For example, it is indicated that, for a product ID "Product A," a fixed cost of "1500" yen and a variable cost of "4200" yen are required as the total cost, and the sales is "1980" yen. Meanwhile, for a product ID "Product B," for example, a fixed cost of "1300" yen and a variable cost of "3100" yen are required as a total cost, and the sales is "600" yen.

FIG. 13A depicts an example of the operation classification rule 2129 depicted in FIG. 11. The operation classification rule 2129 has, for example, a condition (for decision process) column and an operation classification rule column as columns thereof. The operation classification rule column corresponds to the operation classification rule 2129 described hereinabove.

For example, in the example of FIG. 13A, in the case where a query that is used when a data mart 2128 is generated coincides with a condition "select (Y) where (X)," as an operation classification rule, a tag attached to a column Y of a table X is inherited and attached as a tag to the data mart 2128.

On the other hand, for example, in the example of FIG. 13A, in the case where a query that is used when a data mart 2128 is generated meets a condition "join (X1, X2) on x1=x1," as an operation classification rule, a tag attached to tables X1 and X2 is inherited and attached as a tag of the data mart 2128.

FIG. 13B depicts an example of the catalog mapping data 2127A depicted in FIG. 11. Although the catalog mapping data 2127A is substantially similar to the catalog mapping data 2127 in the first embodiment, they are different from each other in such points as described below.

The catalog mapping data 2127A further has a related tag column in addition to the catalog menu column, tag column and mapping column of the catalog mapping data 2127 in the first embodiment.

For example, in the example depicted in FIG. 13B, it is indicated that the "sales" tag of the catalog menu "KPI tree" is attached as the mapping, for example, to "DATA_MART.SALES" that signifies a total payment column of a data mart, and further, as a related tag, "ORDER_MANAGEMENT_DATA.AMOUNT_OF_PAYMENT" that signifies, for example, a payment amount column of order management data is attached.

Figure 14:
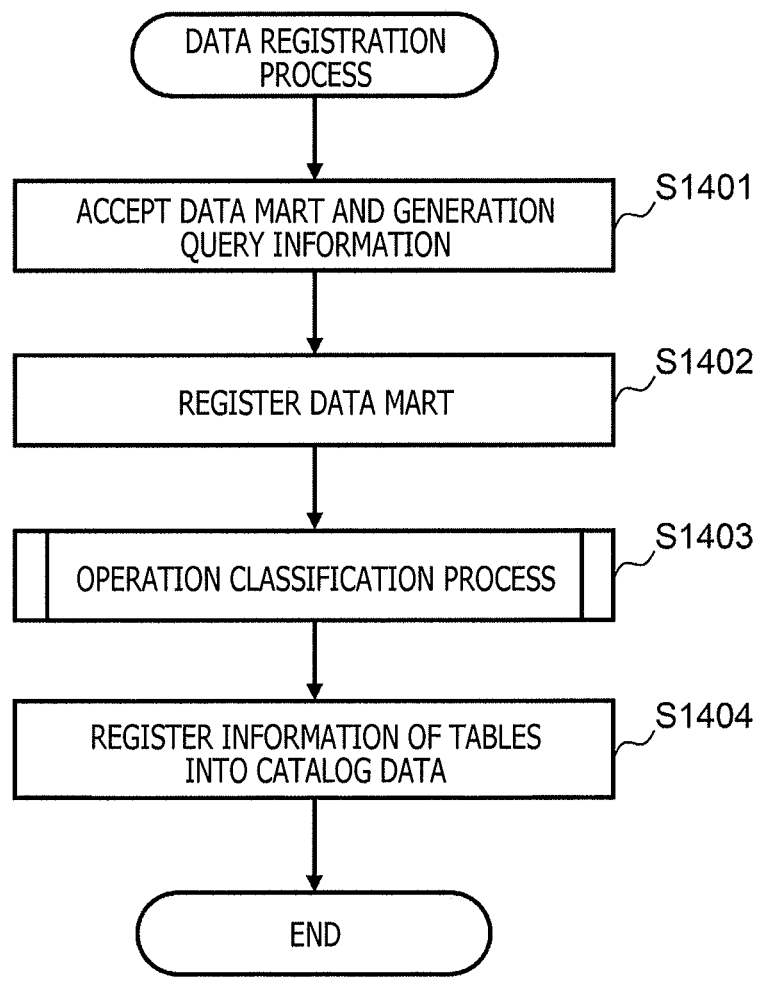
FIG. 14 is a flow chart depicting an example of a processing procedure of a data registration process.

FIG. 14 depicts an example of a processing procedure of a data registration process in the second embodiment. First, if the data management section 2111 accepts a data registration request of certain data from the analysis system 5 (step S1401), then it registers the data as data mart 2128 into the data management section 2111 (step S1402).

Then, the data management section 2111 executes an operation classification process (step S1403). In this operation classification process, the data management section 2111 refers to the catalog mapping data 2127A and the operation classification rule 2129 to analyze the query to decide to which tag of the catalog the data (corresponding to the data mart 2128) registered in the data management section 2111 as described above corresponds and from which table as source data the data is generated, and registers a result of the decision into the catalog data 512 (step S1404).

Figure 15:
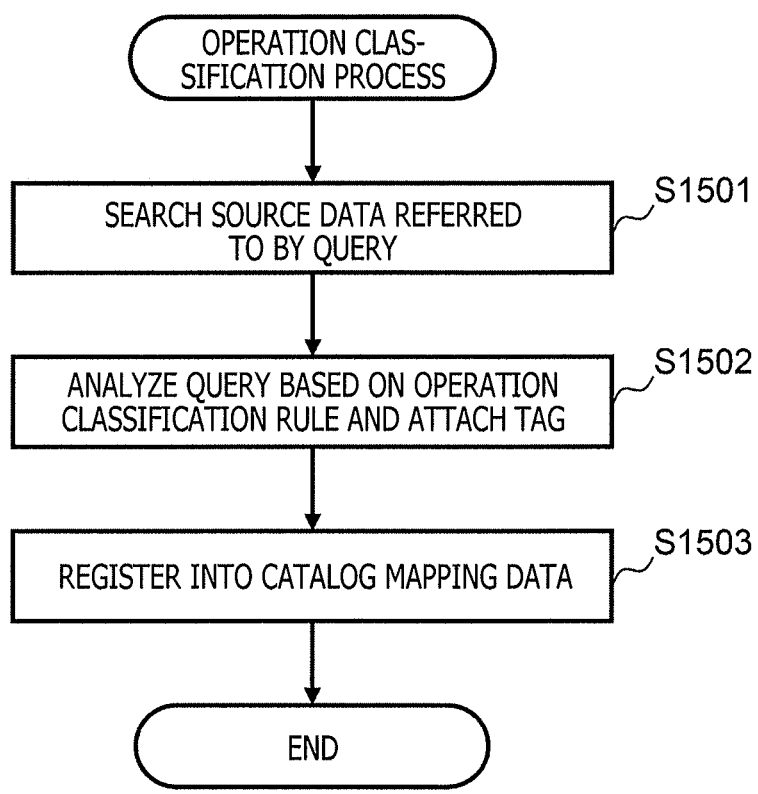
FIG. 15 is a flow chart depicting an example of a processing procedure of an operation classification process.

FIG. 15 depicts an example of a processing procedure of the operation classification process for carrying out analysis in order to search for source data. First, the classification decision section 2112 decides, on the basis of the query attached to the designated data mart 2128, from which table the source data referred to by the applicable query is generated in response to a decision request from the data management section 2111 (step S1501).

Here, although, in the operation classification process described above, it is decided from which table the source data is generated, also source data information may be input from the analysis system 5 in addition to the data mart 2128 described above.

Then, the classification decision section 2112 refers to the operation classification rule 2129 to specify a tag to be attached (step S1502) and registers the applicable specified tag into the catalog mapping data 2127 depicted in FIG. 13B (step S1503).

Figure 16:
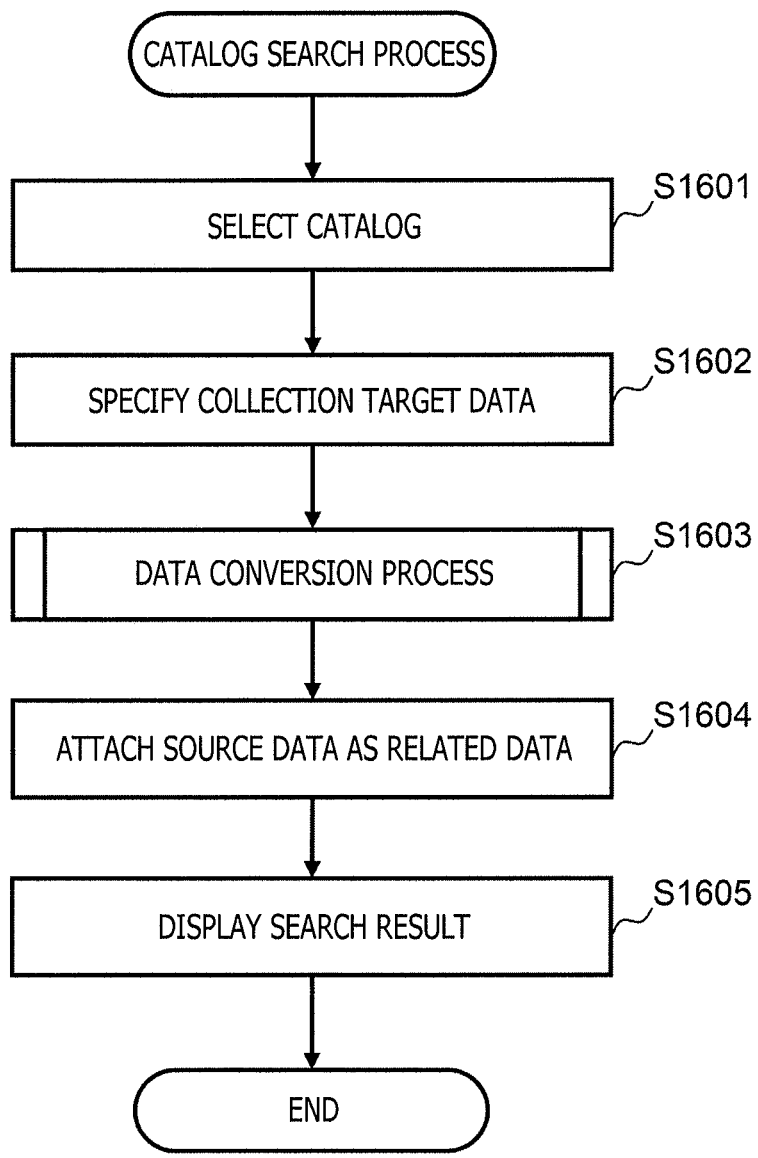
FIG. 16 is a flow chart depicting an example of a processing procedure of a catalog search process.

FIG. 16 depicts an example of a processing procedure of a catalog search process according to the second embodiment. It is to be noted that process from step S1601 to step S1603 are similar to the processes at step S901 to step S903 of the catalog search process (refer to FIG. 9) in the first embodiment, respectively, and therefore, description of them is omitted.

The data management section 2111 attaches the source data as data relating to collection target data (step S1604).

The data management section 2111 refers, in regard to the data mart 2128 specified as collection target data at step S1602, to the related tag column of the catalog mapping data 2127 depicted in FIG. 13B to specify the source data of the data mart 2128 and displays the specified source data as a search result (step S1605).

Figure 17:
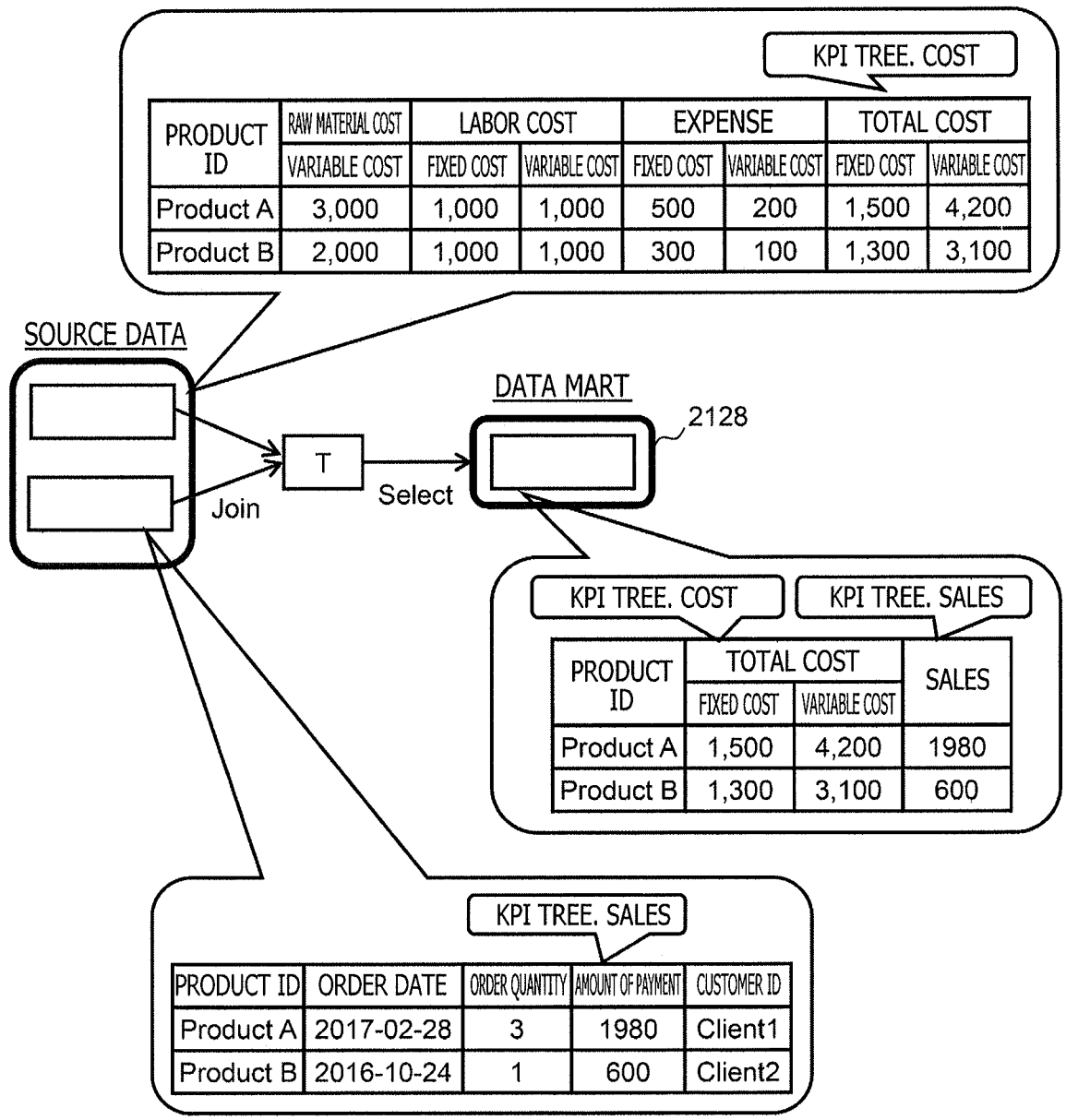
FIG. 17 is a view depicting an example of attaching a tag to a data mart in the second embodiment.

FIG. 17 depicts an example in which a tag is attached to the data mart 2128 in the second embodiment. First, an example of a query for generating a data mart 2128 is described below.

An intermediate table T for executing the query given below is generated for $X$=cost management data 2121 and $Y$=order management data 2122

$T$=Join($X,Y$) on product ID=product ID

At this time, into the intermediate table T, all columns of the cost management data 2121 and the order management data 2122 are copied, and records in which the product ID columns of the cost management data 2121 and the order management data 2122 have an equal value are coupled as a set.

Here, if the operation classification process (corresponding to S1403 of FIG. 14 described hereinabove) is executed, then the classification decision section 2112 specifies the cost management data 2121 and the order management data 2122 as source data (corresponding to step S1501 of FIG. 15 described hereinabove) and specifies a rule of Join registered second in the operation classification rule 2129, and all tags of the cost management data 2121 and the order management data 2122 are inherited by the columns of the intermediate table T.

In particular, the classification decision section 2112 refers to the catalog mapping data 2127 such that the tags of "cost" of the fixed cost column and the variable cost column of the order management data 2122 and the tag of "sales" attached to the amount-of-payment column of the cost management data 2121 are inherited by and attached to the fixed cost column, variable cost column and amount-of-payment column of the intermediate table T, respectively.

Furthermore, tags are attached in the following manner to the columns of the intermediate table T. To the columns copied from the cost management data 2121, the columns of the cost management data 2121 are attached as related tags. To the columns copied from the order management data 2122, the columns of the order management data 2122 are attached as related tags (corresponding to step S1502 of FIG. 15 described hereinabove).

Then, the classification decision section 2112 can obtain a data mart 2128 by setting Z to $$Z = \text{data mart } \mathbf{2128}$$

and executing such a query as given below for the generated intermediate table T.

$$Z = \text{Select(product ID,total cost,amount of payment AS sales)}$$

Where T

At this time, into the data mart 2128, the product ID column, total cost column and amount-of-payment column of the intermediate table T are copied, and further, among them, in the amount-of-payment column, the column name is rewritten to the sale column.

Here, in the case where step S1502 of the operation classification process (step S1403 of FIG. 14) described hereinabove is executed similarly as described above, the Select rule registered first in the operation classification rule 2129 depicted in FIG. 13A is applied. In particular, the tag of "cost" attached to the fixed cost column and the variable cost column of the intermediate table T and the tag of "sales" applied to the amount-of-payment column are inherited by and attached to the fixed cost column, variable cost column and sales column (corresponding to step S1502 of FIG. 15 described hereinabove), respectively. A result of the attachment of the tags is registered into the mapping column of the catalog mapping data 2127.

Further, into the fixed cost column and the variable cost column of the data mart 2128, the fixed cost column and the variable cost column of the cost management data 2121 attached to the fixed cost column and the variable cost column of the intermediate table T are attached as related tags, respectively. Meanwhile, into the sales column of the data mart 2128, the amount-of-payment column of the order management data 2122 attached to the amount-of-payment column of the intermediate table T is attached as a related tag (corresponding to step S1603 of FIG. 16 described hereinabove).

By executing the operations described above, the data management node 2A can generate catalog mapping data 2127 for a data mart 2128.

By executing such processes as described above, a catalog registration process into the intermediate table T as secondary data processed from source data as the data mart 2128 and association with the source data when search is performed can be implemented, and this makes it possible to estimate a different data mart for an analyst different from the analyst who has used a query generated from which the applicable data mart 2128 is generated.

(3) Variation where Classification Cannot be Perform Upon Editing of KPI Tree In the case where such classification as described above cannot be performed in the embodiments described above, the following countermeasures may be applied.

(3-1) Where One-to-One Mapping cannot Be Performed

In the case where mapping cannot be performed in a lower layer of a KPI tree (for example, source data operated by a query), mapping may be performed in an upper layer (for example, in the data mart 2128). Furthermore, in order to support mapping by a user, information in which classification candidates are narrowed down may be displayed on a display device to present them to a user.

(3-2) Where KPI does not Have Tree Format

For example, in the case where the KPI cannot have a tree format like an advertisement to existing customers for sales improvement and an advertisement to new customers for sales improvement, as a basic policy, tags are simplified as far as possible. For example, in the case where separation criteria of individual advertisements can be prescribed as a classification rule, they are converted into catalog tags as different indexes. However, in the case where such separation conditions cannot be prescribed in this manner, they are not converted into catalog tags but narrowed down information of classification candidates by a user is displayed on a display device so as to present them to the user.

(4) Other Embodiments

The embodiments described above are exemplary for explaining the present disclosure and are not intended to restrict the present disclosure only to the embodiments described above. The present disclosure can be carried out in various forms without departing from the subject matter thereof. Although, in the foregoing description, information is sometimes described using such terms as "~table" or the like, such information may be represented in a term other than a data structure such as table. Therefore, in order to indicate that such information does not rely upon a data structure, the "~table" or the like is sometimes called 2~information." Although, in order to describe the substance of each piece of operation identification information of a representation such as "number" or "name" is adopted, some other identification information may be used. Furthermore, any "~program" in the foregoing description may be "~program." Further, a "~section" where it is used as the subject in the foregoing description may be changed to a description in which a processor is used as the subject. Part or all of processes may be implemented by hardware for exclusive use. The various programs may be installed from a program distribution server or a computer-readable non-transitory storage medium into various computers.

INDUSTRIAL APPLICABILITY

The present disclosure can be applied widely to a data catalog automatic generation system relating to a technology for classifying and analyzing field data that are not standardized on a field in a so-called Data Lake system.

What is claimed is:

1. A data catalog automatic generation system that generates a catalog tag to be used to select analysis data from collected field data, comprising:

a memory;

a network interface configured to accept the field data; and a processor communicatively coupled to the memory and the network interface, wherein the processor is configured to:

extract, based on a classification rule, a relationship between an objective variable as an analysis perspective of the field data and an explanatory variable corresponding to the objective variable or a causal relationship between a plurality of the explanatory variables corresponding to the objective variable, determine if an acquisition source of the field data is known, on a condition that the acquisition source of the field data is known, specify a first catalog tag for the objective variable and a second catalog tag for the explanatory variable on the basis of a source classification rule as the classification rule and supplementary information attached to source data that is the acquisition source of the field data, on a condition that the acquisition source of the field data is unknown, compare management data of a plurality of known acquisition sources and the field data to calculate a similarity degree, select one of the plurality of known acquisition sources based on the similarity degree, and specify the first catalog tag and the second catalog tag based on the one of the plurality of known acquisition sources, and attach the catalog tag, based on a result of the extraction of the relationship or the causal relationship, to the field data to manage the field data, wherein the classification rule is based on a previous catalog tag, such that with each classification rule created the catalog tag is improved.

2. The data catalog automatic generation system according to claim 1, wherein the processor extends the source classification rule on the basis of frequent word analysis used in a table relating to the objective variable and the explanatory variable or a relation priority degree between a plurality of columns in the table.

3. The data catalog automatic generation system according to claim 1, wherein the processor specifies, where a query having been used to generate a data mart satisfies a given condition, the field data having been used in the query on the basis of an operation classification rule as the classification rule, and attach a catalog tag of the objective variable to manage the field data.

4. The data catalog automatic generation system according to claim 3, wherein the processor estimates a different data mart from the query from which the data mart has been generated.

5. A data catalog automatic generation method for generating a catalog tag to be used to select analysis data from collected field data, comprising:

accepting, via a network interface, the field data;

extracting, via a processor, based on a classification rule, a relationship between an objective variable as an analysis perspective of the field data and an explanatory variable corresponding to the objective variable or a causal relationship between a plurality of the explanatory variables corresponding to the objective variable, determine if an acquisition source of the field data is known, on a condition that the acquisition source of the field data is known, specify a first catalog tag for the objective variable and a second catalog tag for the explanatory variable on the basis of a source classification rule as the classification rule and supplementary information attached to source data that is the acquisition source of the field data, on a condition that the acquisition source of the field data is unknown, compare management data of a plurality of known acquisition sources and the field data to calculate a similarity degree, select one of the plurality of known acquisition sources based on the similarity degree, and specify the first catalog tag and the second catalog tag based on the one of the plurality of known acquisition sources, attaching the catalog tag, based on a result of the extraction of the relationship or the causal relationship, to the field data to manage the field data, wherein the classification rule is based on a previous catalog tag, such that with each classification rule created the catalog tag is improved.

\* \* \* \* \*